United States Patent [19]

Gian et al.

[11] Patent Number: 5,249,560
[45] Date of Patent: Oct. 5, 1993

[54] METHOD AND SYSTEM FOR OPERATING AUTOMOTIVE INTERNAL COMBUSTION ENGINE DURING START-UP

[75] Inventors: David J. Gian, Northville; Gerald T. Klarr, Livonia, both of Mich.

[73] Assignee: Ford Motor Company, Dearborn, Mich.

[21] Appl. No.: 806,506

[22] Filed: Dec. 13, 1991

[51] Int. Cl.$^5$ ............................................. F02D 41/06
[52] U.S. Cl. ..................................... 123/443; 123/491
[58] Field of Search ............... 123/478, 480, 481, 491, 123/493, 443; 60/284, 285

[56] References Cited

U.S. PATENT DOCUMENTS

| | | | |
|---|---|---|---|
| 3,672,172 | 6/1972 | Hammond | 60/282 |
| 3,756,205 | 9/1973 | Frost | 123/481 |
| 3,877,229 | 4/1975 | Resler, Jr. | 60/597 |
| 3,924,408 | 12/1975 | Beiswenger | 60/290 |
| 3,949,551 | 4/1976 | Eichler et al. | 60/284 X |
| 3,969,894 | 7/1976 | Bachmann | 60/307 |
| 4,007,590 | 2/1977 | Nagai et al. | 60/284 |
| 4,040,395 | 8/1977 | Demetrescu | 123/481 |
| 4,075,837 | 2/1978 | Hanaoka | 60/282 |
| 4,096,692 | 6/1978 | Nakamura et al. | 60/307 |
| 4,165,610 | 8/1979 | Iizuka et al. | 60/284 |
| 4,393,825 | 7/1983 | Breeck et al. | 123/481 X |
| 4,442,673 | 4/1984 | Haworth | 60/618 |
| 4,463,554 | 8/1984 | Südbeck et al. | 60/274 |
| 4,469,071 | 9/1984 | Bassi et al. | 123/481 |
| 4,473,045 | 9/1984 | Bolander et al. | 123/481 X |
| 4,550,704 | 11/1985 | Barho et al. | 123/481 |

*Primary Examiner*—Willis R. Wolfe
*Attorney, Agent, or Firm*—Jerome R. Drouillard; Roger L. May

[57] ABSTRACT

A system and method for operating an automotive internal combustion engine during start-up includes steps of sampling at least one operating parameter of the engine, comparing the sampled parameter to a predetermined range for such parameter, and in the event that the sampled parameter falls outside of the predetermined range, operating some of the engine's cylinders according to a base fuel schedule, while reducing the time-averaged amount of fuel provided to the remaining cylinders. Once the sampled parameter falls within the predetermined range, all cylinders of the engine will be operated according to the same fuel schedule.

2 Claims, 1 Drawing Sheet

METHOD AND SYSTEM FOR OPERATING AUTOMOTIVE INTERNAL COMBUSTION ENGINE DURING START-UP

FIELD OF INVENTION

BACKGROUND OF THE INVENTION

This invention relates to a method and system for operating the fuel delivery componentry of an automotive engine so as to provide additional exhaust gas oxygen during initial operation or start-up of the engine.

DISCLOSURE INFORMATION

Automotive exhaust emission control systems have used oxidizing catalysts for many years. With certain engines, it is necessary to provide additional air to the exhaust stream for the purpose of increasing the oxygen content of the exhaust so as to provide sufficient oxygen for an oxidizing catalyst to complete the oxidation of unburned elements of the exhaust stream into the carbon dioxide and water vapor.

Automotive exhaust emission control systems have commonly used engine-driven pumps, as shown in U.S. Pat. No. 3,924,408 to Beiswenger et al., for the purpose of providing excess air to the exhaust stream. Another known type of system uses exhaust pressure pulses to aspirate additional air into the exhaust stream. Pumping type devices suffer from the drawback that the engine's shaft horsepower is partially consumed for the purpose of driving the pump. On the other hand, aspiration type devices are difficult to control, and their valve elements are prone to premature wear and failure. Also, both types of devices require the addition of costly, and sometimes unreliable, hardware.

U.S. Pat. No. 3,877,229 to Resler, Jr., and U.S. Pat. No. 4,442,673 to Haworth disclose internal combustion engines having one cylinder which is used for compressing air which is supplied to an exhaust afterburner. These arrangements, too, have high parasitic losses associated with the total dedication of the pumping cylinders to compressor service.

U.S. Pat. No. 3,672,172 to Hammond, U.S. Pat. No. 3,969,894 to Bachmann, U.S. Pat. No. 4,096,692 to Nakamura et al. and U.S. Pat. No. 4,463,554 to Sudbeck et al. all disclose additional systems in which a portion of an engine is used as a dedicated air pump for providing pressurized air for exhaust treatment purposes. Accordingly, the '172 patent uses the engine crankcase as a compressor chamber. The '894 patent uses a special type of piston The '692 patent uses the engine crankcase as a compression chamber. The '554 patent has an engine driven blower which may be used as a supercharger or as a means for supplying secondary air to the exhaust system of the engine.

U.S. Pat. No. 4,075,837 to Hanaoka discloses a system in which an engine has a divided intake manifold and two separate carburetors, with one carburetor feeding a single engine cylinder and the other carburetor feeding the balance of the cylinders, such that the composition of the exhaust gas may be changed by operating one of the cylinders at a different air/fuel mixture. The system described in the '837 patent is undesirable because it eliminates fuel from a single fixed cylinder of the engine, and as a result, the vibration of the engine will enhance markedly at operating modes in which the single cylinder is operating at a reduced air/fuel ratio. Also, the carburetor feeding the single cylinder is not well suited to precise control of the air/fuel ratio, and as a result, the single cylinder fed by the carburetor may well misfire in the event that lean operation is desired. As noted elsewhere in this specification, lean misfire will produce a large quantity of unburned hydrocarbons.

It is an object of the present invention to provide a method and system for operating an engine so as to provide increased exhaust gas oxygen.

It is yet another object of the present invention to provide a method and system for operating an engine so as to produce increased exhaust gas oxygen without concomitant unacceptable increases in weight, vibration, and other undesirable aspects associated with prior art air injection systems.

It is an advantage of the present invention that a system according to this invention provides extra exhaust gas oxygen without the need for additional engine hardware.

It is yet another advantage of the present invention that a system according to this invention may be integrated into an electronic engine control used for the purpose of controlling engine air/fuel ratio, exhaust gas recirculation (EGR), and spark timing.

Other objects, features and advantages of the present invention will be apparent to the reader of this specification.

SUMMARY OF THE INVENTION

According to the present invention, a method for operating a multicylinder automotive internal combustion engine during start-up includes the steps of sampling at least one operating parameter of the engine and comparing the sampled parameter to a predetermined range for such parameter. In the event that the sampled parameter falls outside of the predetermined range, some of the engine's cylinders will be operated according to a base fuel schedule, while the remaining cylinders will be provided with a reduced amount of fuel. The reduced amount of fuel will be less than that provided according to the base schedule on a time averaged basis. The sampled operating parameter will be periodically resampled, and all of the cylinders of the engine will be operated according to the same fuel schedule only when the engine has been operated sufficiently that the sampled operating parameter falls within the predetermined range. The cylinders operating according to a reduced fuel schedule may be operated at an air/fuel ratio of approximately 16/1, or at some other air/fuel ratio known to those skilled in the art and suggested by this disclosure. At the 16/1 ratio, the cylinder will be operated lean of stoichiometric but not so lean that misfire will result. The cylinders operated according to the base fuel schedule may be operated during cold start-up at an air/fuel ratio of approximately 13/1. As before, those skilled in the art will appreciate that the base fuel schedule may be selected according to the needs of the particular engine or emission control system which is being equipped with a system and method according to the present invention.

As an alternative, a cylinder being operated with reduced fuel may be operated with no fuel at all. It may, however, be desirable with certain engines to operate the cylinder at a finite air/fuel ratio to prevent engine balance problems The sampled operating parameter used in conjunction with the present method may be catalyst temperature, engine temperature, specifically engine exhaust temperature, engine cooling temperature, engine lubricant temperature, or charge air temperature. Alternatively, the sampled operating parameter may be engine operating time. As yet another alternative, more than one parameter may be sampled according to the present method.

As another aspect of the present method for start-up operation of a multicylinder internal combustion engine having individual cylinder fuel injection, in the event that a sampled parameter falls outside of a predetermined range, some of the engine's fuel injectors may be operated according to a base fuel schedule while reducing the time-averaged amount of fuel provided to the remaining injectors to amount less than that provided according to the base schedule. As a result of this, the oxygen content of the exhaust flowing from the engine will be increased. Once the sampled parameter falls within the predetermined operating range, all of the injectors of the engine may be operated according to the same fuel schedule. The injectors operating according to the base fuel schedule during the start-up routine described herein may be selected at random. Alternatively, the injectors may be selected according to a prescribed sequence.

According to yet another aspect of the present invention, a system for operating a multicylinder automotive internal combustion engine, having individual cylinder fuel injectors and an exhaust treatment catalyst, includes a controller for operating the fuel injectors, with the controller comprising sampling means for periodically determining the value of at least one operating parameter of the engine, comparator means for comparing the value of the sampled parameter to a predetermined range for such parameter, and operator means for pulsing the fuel injectors such that in the event that the sampled parameter falls outside of the predetermined range, some of the engine's fuel injectors will be pulsed according to a base fuel schedule, while the time-averaged amount of fuel provided by the remaining injectors will be reduced to an amount which is less than that provided according to the base schedule, so as to increase the oxygen content of the exhaust flowing from the engine, with the operator pulsing all injectors of the engine according to the same fuel schedule when the engine has been operated sufficiently that the sampled operating parameter falls within the predetermined range.

DETAILED DESCRIPTION OF THE PREFERRED EMBODIMENTS

Figure 1:
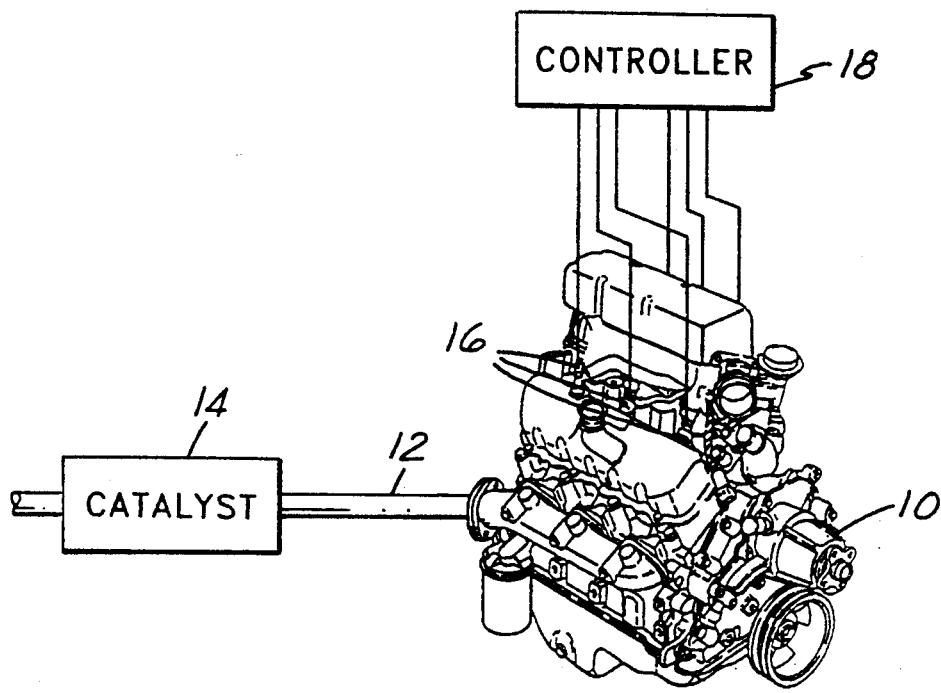
FIG. 1 is a schematic representation of an automotive internal combustion engine having a system according to the present invention.

As shown in FIG. 1, an internal combustion engine, 10, which comprises a multicylinder automotive internal combustion engine, is equipped with a plurality of fuel injectors, 16. Although a four-cylinder engine is illustrated, those skilled in the art will appreciate in view of this disclosure that a method and system according to the present invention could be applied to multicylinder engines having three, four, five, six, eight, ten, twelve, or yet other numbers of cylinders. Fuel injectors 16 are operated by a controller, 18, which receives inputs from engine 10 in the form of engine temperature, engine speed, engine charge air temperature, air/fuel ratio, throttle position, ambient temperature, and other operating parameters The exhaust from engine 10 leaves via an exhaust pipe, 12, and flows to a catalyst, 14, wherein the chemical composition of the exhaust is altered. Catalyst 14 presumably includes at least an oxidizing catalyst. Those skilled in the art will realize in view of this disclosure that catalyst 14 could comprise an oxidizing catalyst, a combination oxidizing and reducing catalyst, a thermal reactor, or other type of exhaust aftertreatment device. Accordingly, as used herein, the term "catalyst" means all of the aforementioned devices.

A method and system according to the present invention provides increased exhaust gas oxygen to allow the oxidation of unburned hydrocarbons and carbon monoxide, inter alia, in the following manner. Controller 18 samples at least one operating parameter, for example, engine temperature, in the form of charge air temperature, cooling temperature, oil temperature, or some other indicator of engine operating temperature, such as exhaust temperature or catalyst temperature. Other operating parameters such as ambient temperature and engine load may be employed in a strategy according to the present invention. The use of ambient temperature as a factor for enabling the use of a start-up fuel schedule according to the present invention will allow the present system to adapt an automotive engine for running in sub-tropical climates. Throttle position may be used as a measure of engine load, either alone, or in combination with engine speed or yet another parameter.

It has been determined that the majority of the unburned hydrocarbon emissions from automotive type internal combustion engines are generated during start-up operation of the engine, particularly where the engine is cold. Thus, during cold engine operation, the present system will operate one or more of the engine's cylinders at a relatively lean air/fuel ratio so as to provide additional air to catalyst 14, so as to render additional oxygen available to participate in catalyzed oxidation reactions within the catalyst.

Figure 2:
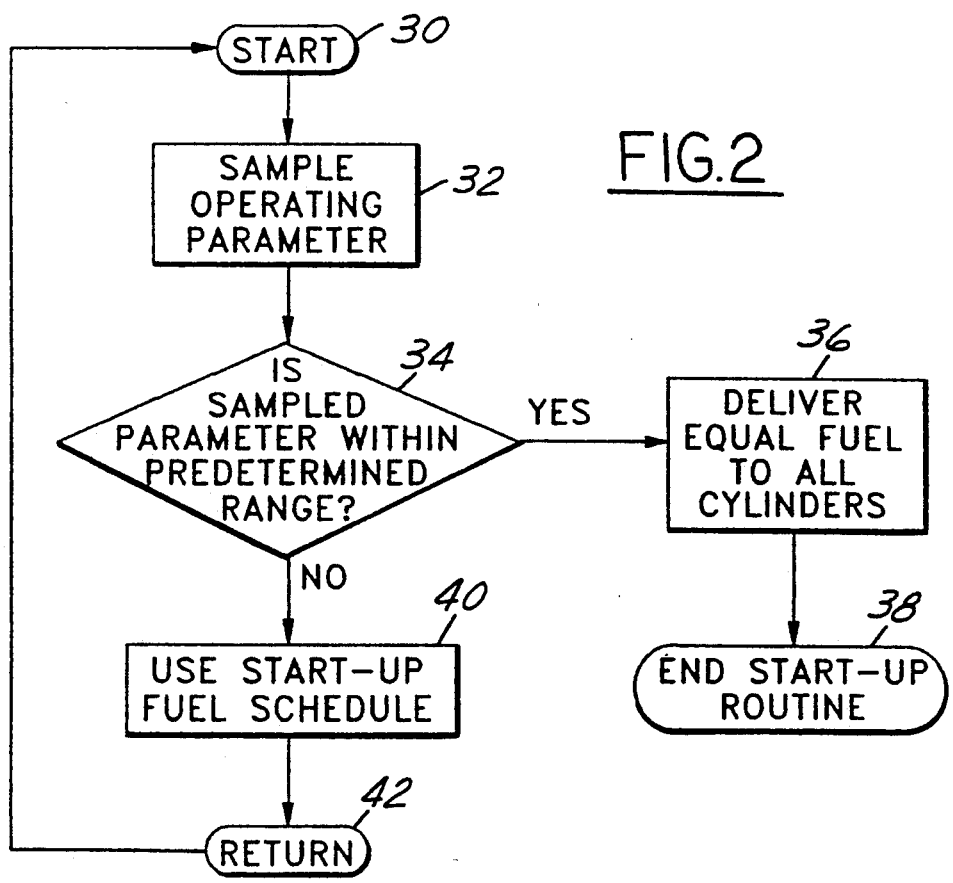
FIG. 2 is a flowchart illustrating a method according to the present invention

Turning now to FIG. 2, a start-up routine according to the present invention begins at block 30 with initiation. Moving to block 32, controller 18 samples one of the previously mentioned operating parameters, such as engine temperature. At block 34, controller 18 asks the question: "Is the sampled operating parameter within a predetermined range?". For example, is the engine operating temperature within a warmed-up range such that the engine is acceptably burning the fuel which is injected? If the answer to the question in block 34 is "yes", the engine in this example is properly warmed-up and the program moves to block 36, wherein controller 18 arranges to deliver equal fuel to all the cylinders via injectors 16. Then, controller 18 moves to block 38 where the start-up routine is ended. If, on the other hand, the answer to the question at block 34 is "no," the controller will move to block 40 and utilize a start-up fuel schedule. Note that a start-up fuel schedule will be continued whenever the sampling indicates that the sampled operating parameter is not within the predetermined range. When using a start-up fuel schedule as commanded by block 40, some of the engine's cylinders will be operated according to a base fuel schedule by commanding injectors for those signals to operate at a pulse width corresponding to, for example, at cold start-up, approximately a 13/1 air/fuel ratio, which is a base fuel schedule selected to provide smooth, misfire-free running. During cold operation, it is necessary to provide excess air, as described above. Accordingly, the remaining cylinders of the engine will be operated so as to receive reduced fuel on a time-averaged basis. This may be accomplished by reducing the injector pulse width either to zero, or to some reduced value during, for example, every other induction period, or every fourth or sixth induction period, depending upon the upon amount of excess air needed by catalyst 14.

If more than one engine operating parameter is used with a start-up routine according to the present invention, the flow diagram in FIG. 2 may be employed by sampling all such parameters at block 32 and by asking the question at block 34—Are all sampled parameters within their predetermined ranges? If the answer is in the affirmative, the routine will move to block 36, as previously explained. If not, the routine will move to block 40, as before. The use of multiple engine operating parameters in a strategy according to the present invention may be beneficial in the following manner. If, for example, it is determined that a particular engine runs roughly with the start-up fuel schedule at high engine load, the fuel delivery may be switched to the base schedule whenever such loads are encountered.

To avoid unwanted wear problems or other difficulties which could arise from operating the same cylinders at a reduced fuel schedule whenever the engine is operating according to the start-up routine, the cylinders to be operated according to a base schedule could be selected either at random, or according to a predetermined sequence. In either event, if the sampled parameter falls outside of a predetermined range, during the start-up routine, a bifurcation will be set up in which some of the fuel injectors are pulsed according to a base fuel schedule, while the time-averaged fuel provided the remaining injectors will be reduced by an amount which is less than that provided according to the base schedule by pulsing the remaining injectors at a reduced pulse width. Once the engine has operated sufficiently that increased exhaust oxygen content is no longer needed, the operator will pulse all injectors according to the same fuel schedule.

Note that the present system offers flexibility that is unmatched by prior art systems because such systems are generally unable to precisely control the air/fuel ratio in the lean running cylinders, so as to avoid lean misfire. Avoidance of lean misfire is very important because misfire is accompanied by gross increases in unburned hydrocarbons, and this exhaust gas constituent is precisely one which the method and system according to the present invention is intended to help eliminate.

While the best modes for carrying out the invention have been described in detail, those familiar with the arts to which this invention relates will recognize alternative designs and embodiments for practicing the invention. Thus, the above-described preferred embodiments are intended to be illustrative of the invention, which may be modified within the scope of the following claims.

We claim:

1. A method for operating a multicylinder automotive internal combustion engine having individual cylinder fuel injectors and an exhaust treatment catalyst, comprising the steps of:
    sampling at least one operating parameter of the engine;
    comparing the sampled parameter to a predetermined range for such parameter; and
    in the event that the sampled parameter falls outside of said predetermined range, operating some of the engine's cylinders according to a base fuel schedule, providing an air/fuel ratio of approximately 13/1, while reducing the time-averaged amount of fuel provided to the remaining cylinders to an amount giving an air/fuel ratio of approximately 16/1, such that said remaining cylinders will be operated at an air/fuel ratio which is lean of stoichiometric, but not so lean that misfire results, while periodically re-sampling said operating parameter; and
    operating all cylinders of the engine according to the same fuel schedule when said engine has been operated sufficiently that the sampled operating parameter falls within said predetermined range.

2. A method according to claim 1, wherein the sampled operating parameter comprises engine temperature.

* * * * *